United States Patent
Kleve et al.

(10) Patent No.: US 9,688,246 B2
(45) Date of Patent: Jun. 27, 2017

(54) METHOD AND APPARATUS FOR IN-VEHICLE ALARM ACTIVATION AND RESPONSE HANDLING

(71) Applicant: Ford Global Technologies, LLC, Dearborn, MI (US)

(72) Inventors: Robert Bruce Kleve, Dearborn, MI (US); John Robert Van Wiemeersch, Novi, MI (US); Ritesh Pandya, Rochester Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 373 days.

(21) Appl. No.: 13/775,697

(22) Filed: Feb. 25, 2013

(65) Prior Publication Data

US 2014/0240111 A1 Aug. 28, 2014

(51) Int. Cl.
 B60R 25/10 (2013.01)
 B60R 25/102 (2013.01)
 G08B 25/01 (2006.01)

(52) U.S. Cl.
 CPC .......... B60R 25/102 (2013.01); G08B 25/016 (2013.01)

(58) Field of Classification Search
 CPC .... G06F 3/017; G06F 21/32; H04M 2242/04; H04M 11/04; G08B 25/00; G08B 25/016; G08B 21/22; B60R 25/10–25/104; B60R 25/30–25/34; B60R 25/305; B60R 2325/205
 USPC ... 340/426.1, 426.12, 426.13, 426.17–426.2, 340/574, 5.82–5.84; 379/37, 38, 44, 45; 455/404.1, 404.2
 See application file for complete search history.

(56) References Cited

U.S. PATENT DOCUMENTS

| | | | |
|---|---|---|---|
| 4,543,569 A | 9/1985 | Karlstrom | |
| 5,081,667 A | 1/1992 | Drori et al. | |
| 5,467,070 A | 11/1995 | Drori et al. | |
| 5,513,107 A | 4/1996 | Gormley | |
| 5,515,285 A * | 5/1996 | Garrett et al. | ............. 340/426.2 |
| 5,627,510 A | 5/1997 | Yuan | |
| 5,635,916 A | 6/1997 | Bucholtz et al. | |

(Continued)

FOREIGN PATENT DOCUMENTS

| | | |
|---|---|---|
| CN | 1863052 | 11/2006 |
| CN | 101596895 | 12/2009 |

(Continued)

OTHER PUBLICATIONS

Autobiometrics, COM, US Distributor for ATRD Biometric Immobilizer, http://www.autobiometrics.com, Jul. 6, 2011.

(Continued)

Primary Examiner — Thomas Mullen
(74) Attorney, Agent, or Firm — Jennifer Stec; Brooks Kushman P.C.

(57) ABSTRACT

A system includes one or more processors configured to detect activation of an alarm trigger in communication with the one or more processors. The processors are further configured to determine a type of trigger and provide a subtle feedback response, based on the type of trigger, designed to avoid detection by an assailant. The processors are additionally configured to wirelessly contact an emergency responder and provide data usable in determining a vehicle location and a vehicle identification.

11 Claims, 5 Drawing Sheets

(56) References Cited

U.S. PATENT DOCUMENTS

| | | | |
|---|---|---|---|
| 5,655,081 A | 8/1997 | Bonnell et al. | |
| 5,734,336 A | 3/1998 | Smithline | |
| 5,776,031 A | 7/1998 | Minowa et al. | |
| 5,811,886 A * | 9/1998 | Majmudar | 340/426.12 |
| 5,828,319 A | 10/1998 | Tonkin et al. | |
| 5,874,889 A | 2/1999 | Higdon et al. | |
| 5,959,540 A | 9/1999 | Walter | |
| 6,002,326 A * | 12/1999 | Turner | 340/426.1 |
| 6,018,291 A | 1/2000 | Marble et al. | |
| 6,133,825 A | 10/2000 | Matsuoka | |
| 6,177,866 B1 | 1/2001 | O'Connell | |
| 6,198,996 B1 | 3/2001 | Berstis | |
| 6,263,282 B1 | 7/2001 | Vallancourt | |
| 6,268,804 B1 | 7/2001 | Janky et al. | |
| 6,271,745 B1 | 8/2001 | Anzai et al. | |
| 6,282,226 B1 | 8/2001 | Furukawa | |
| 6,434,455 B1 | 8/2002 | Snow et al. | |
| 6,434,486 B1 | 8/2002 | Studt et al. | |
| 6,438,491 B1 | 8/2002 | Farmer | |
| 6,539,078 B1 | 3/2003 | Hunt et al. | |
| 6,574,734 B1 | 6/2003 | Colson et al. | |
| 6,590,495 B1 | 7/2003 | Behbehani | |
| 6,668,221 B2 | 12/2003 | Harter, Jr. et al. | |
| 6,679,702 B1 | 1/2004 | Rau | |
| 6,690,260 B1 | 2/2004 | Ashihara | |
| 6,737,963 B2 | 5/2004 | Gutta et al. | |
| 6,754,562 B2 | 6/2004 | Strege et al. | |
| 6,785,542 B1 | 8/2004 | Blight et al. | |
| 6,810,309 B2 | 10/2004 | Sadler et al. | |
| 6,853,919 B2 | 2/2005 | Kellum | |
| 6,859,718 B2 | 2/2005 | Fritz et al. | |
| 6,871,145 B2 | 3/2005 | Altan et al. | |
| 6,906,619 B2 | 6/2005 | Williams et al. | |
| 6,941,194 B1 | 9/2005 | Dauner et al. | |
| 7,057,501 B1 | 6/2006 | Davis | |
| 7,075,409 B2 | 7/2006 | Guba | |
| 7,102,496 B1 | 9/2006 | Ernst, Jr. et al. | |
| 7,124,027 B1 | 10/2006 | Ernst, Jr. et al. | |
| 7,148,790 B2 | 12/2006 | Aoyama et al. | |
| 7,161,563 B2 | 1/2007 | Vitale et al. | |
| 7,173,903 B2 | 2/2007 | Remboski et al. | |
| 7,194,069 B1 | 3/2007 | Jones et al. | |
| 7,207,041 B2 | 4/2007 | Elson et al. | |
| 7,228,213 B2 | 6/2007 | Sakai et al. | |
| 7,245,204 B2 * | 7/2007 | Ramos et al. | 340/426.12 |
| 7,246,062 B2 | 7/2007 | Knott et al. | |
| 7,266,438 B2 | 9/2007 | Kellum et al. | |
| 7,337,113 B2 | 2/2008 | Nakagawa et al. | |
| 7,340,332 B2 | 3/2008 | Underdahl et al. | |
| 7,356,394 B2 | 4/2008 | Burgess | |
| 7,366,892 B2 | 4/2008 | Spaur et al. | |
| 7,375,620 B2 | 5/2008 | Balbale et al. | |
| 7,391,305 B2 | 6/2008 | Knoll et al. | |
| 7,484,008 B1 | 1/2009 | Gelvin et al. | |
| 7,565,230 B2 | 7/2009 | Gardner et al. | |
| 7,602,782 B2 | 10/2009 | Doviak et al. | |
| 7,783,475 B2 | 8/2010 | Neuberger et al. | |
| 7,812,712 B2 | 10/2010 | White et al. | |
| 7,826,945 B2 | 11/2010 | Zhang et al. | |
| 8,050,817 B2 | 11/2011 | Moinzadeh | |
| 8,050,863 B2 | 11/2011 | Trepagnier et al. | |
| 8,089,339 B2 | 1/2012 | Mikan et al. | |
| 8,232,864 B2 | 7/2012 | Kakiwaki | |
| 8,237,554 B2 | 8/2012 | Miller et al. | |
| 8,258,939 B2 | 9/2012 | Miller et al. | |
| 8,301,108 B2 | 10/2012 | Naboulsi | |
| 8,305,189 B2 | 11/2012 | Miller et al. | |
| 8,311,722 B2 | 11/2012 | Zhang et al. | |
| 2001/0021891 A1 | 9/2001 | Kusafuka et al. | |
| 2002/0013650 A1 | 1/2002 | Kusafuka et al. | |
| 2002/0031228 A1 | 3/2002 | Karkas et al. | |
| 2002/0096572 A1 | 7/2002 | Chene et al. | |
| 2002/0097145 A1 | 7/2002 | Tumey et al. | |
| 2003/0004730 A1 | 1/2003 | Yuschik | |
| 2003/0055643 A1 | 3/2003 | Woestemeyer et al. | |
| 2003/0079123 A1 | 4/2003 | Mas Ribes | |
| 2003/0137426 A1 * | 7/2003 | Anthony et al. | 340/574 |
| 2003/0217148 A1 | 11/2003 | Mullen et al. | |
| 2003/0220725 A1 | 11/2003 | Harter, Jr. et al. | |
| 2003/0231550 A1 | 12/2003 | Macfarlane | |
| 2004/0046452 A1 | 3/2004 | Suyama et al. | |
| 2004/0073367 A1 | 4/2004 | Altan et al. | |
| 2004/0124968 A1 | 7/2004 | Inada et al. | |
| 2004/0176906 A1 | 9/2004 | Matsubara et al. | |
| 2004/0227642 A1 | 11/2004 | Giles et al. | |
| 2004/0236475 A1 | 11/2004 | Chowdhary | |
| 2004/0257210 A1 * | 12/2004 | Chen et al. | 340/426.19 |
| 2005/0021597 A1 | 1/2005 | Derasmo et al. | |
| 2005/0033517 A1 | 2/2005 | Kondoh et al. | |
| 2005/0125110 A1 | 6/2005 | Potter et al. | |
| 2005/0134115 A1 | 6/2005 | Betts, Jr. et al. | |
| 2005/0177635 A1 | 8/2005 | Schmidt et al. | |
| 2005/0190039 A1 | 9/2005 | Aoyama et al. | |
| 2005/0193212 A1 | 9/2005 | Yuhara | |
| 2005/0261816 A1 | 11/2005 | DiCroce et al. | |
| 2006/0056663 A1 | 3/2006 | Call | |
| 2006/0132294 A1 * | 6/2006 | Spark | 340/426.1 |
| 2006/0142917 A1 | 6/2006 | Goudy | |
| 2006/0150197 A1 | 7/2006 | Werner | |
| 2006/0156315 A1 | 7/2006 | Wood et al. | |
| 2006/0220904 A1 | 10/2006 | Jarlengrip | |
| 2006/0250224 A1 | 11/2006 | Steffel et al. | |
| 2006/0293813 A1 | 12/2006 | Nou | |
| 2007/0027595 A1 | 2/2007 | Nou | |
| 2007/0050854 A1 | 3/2007 | Cooperstein et al. | |
| 2007/0072616 A1 | 3/2007 | Irani | |
| 2007/0100514 A1 | 5/2007 | Park | |
| 2007/0103339 A1 | 5/2007 | Maxwell et al. | |
| 2007/0255568 A1 | 11/2007 | Pennock | |
| 2008/0070616 A1 | 3/2008 | Yun | |
| 2008/0109653 A1 | 5/2008 | Yokohama | |
| 2008/0129472 A1 * | 6/2008 | O'Kere | 340/426.1 |
| 2008/0148374 A1 | 6/2008 | Spaur et al. | |
| 2008/0150683 A1 | 6/2008 | Mikan et al. | |
| 2008/0275604 A1 | 11/2008 | Perry et al. | |
| 2008/0297330 A1 * | 12/2008 | Jeon | 340/426.11 |
| 2009/0030605 A1 | 1/2009 | Breed | |
| 2009/0045928 A1 | 2/2009 | Rao et al. | |
| 2009/0096596 A1 | 4/2009 | Sultan et al. | |
| 2009/0167524 A1 | 7/2009 | Chesnutt et al. | |
| 2009/0184800 A1 | 7/2009 | Harris | |
| 2009/0195370 A1 | 8/2009 | Huffman et al. | |
| 2009/0275281 A1 | 11/2009 | Rosen | |
| 2009/0289780 A1 * | 11/2009 | Tenorio-Fox | 340/425.5 |
| 2009/0309709 A1 | 12/2009 | Bevacqua et al. | |
| 2010/0004818 A1 | 1/2010 | Phelan | |
| 2010/0007479 A1 | 1/2010 | Smith | |
| 2010/0013596 A1 | 1/2010 | Kakiwaki | |
| 2010/0030458 A1 | 2/2010 | Coughlin | |
| 2010/0039224 A1 | 2/2010 | Okude et al. | |
| 2010/0057586 A1 | 3/2010 | Chow | |
| 2010/0075656 A1 | 3/2010 | Hawarter et al. | |
| 2010/0097178 A1 | 4/2010 | Pisz et al. | |
| 2010/0148923 A1 | 6/2010 | Takizawa | |
| 2010/0178872 A1 | 7/2010 | Alrabady et al. | |
| 2010/0191535 A1 | 7/2010 | Berry et al. | |
| 2010/0191973 A1 | 7/2010 | Huntzicker et al. | |
| 2010/0321203 A1 | 12/2010 | Tieman et al. | |
| 2011/0009107 A1 | 1/2011 | Guba et al. | |
| 2011/0071720 A1 | 3/2011 | Schondorf et al. | |
| 2011/0071725 A1 | 3/2011 | Kleve et al. | |
| 2011/0071734 A1 | 3/2011 | Van Wiemeersch et al. | |
| 2011/0102146 A1 | 5/2011 | Giron | |
| 2011/0105097 A1 | 5/2011 | Tadayon et al. | |
| 2011/0106374 A1 | 5/2011 | Margol et al. | |
| 2011/0112969 A1 | 5/2011 | Zaid et al. | |
| 2011/0148574 A1 | 6/2011 | Simon et al. | |
| 2011/0166748 A1 | 7/2011 | Schneider et al. | |
| 2011/0213629 A1 | 9/2011 | Clark et al. | |
| 2011/0215921 A1 | 9/2011 | Ben Ayed et al. | |
| 2011/0275321 A1 | 11/2011 | Zhou et al. | |
| 2011/0295444 A1 | 12/2011 | Westra et al. | |
| 2012/0041633 A1 | 2/2012 | Schunder et al. | |
| 2012/0054036 A1 | 3/2012 | Nam et al. | |

(56) References Cited

U.S. PATENT DOCUMENTS

| | | | |
|---|---|---|---|
| 2012/0071140 | A1 | 3/2012 | Oesterling et al. |
| 2012/0139760 | A1 | 6/2012 | Bevacqua et al. |
| 2012/0157069 | A1 | 6/2012 | Elliott et al. |
| 2012/0280786 | A1 | 11/2012 | Miller et al. |
| 2012/0284702 | A1 | 11/2012 | Ganapathy et al. |
| 2012/0293317 | A1 | 11/2012 | Hanna et al. |
| 2012/0313768 | A1 | 12/2012 | Campbell et al. |
| 2013/0005302 | A1 | 1/2013 | Ozaki |
| 2013/0135118 | A1* | 5/2013 | Ricci .......................... 340/932.2 |
| 2013/0162421 | A1 | 6/2013 | Inaguma et al. |
| 2013/0200999 | A1 | 8/2013 | Spodak et al. |

FOREIGN PATENT DOCUMENTS

| | | |
|---|---|---|
| DE | 102007046270 | 4/2009 |
| EP | 0449471 | 10/1991 |
| EP | 0971463 | 1/2000 |
| EP | 1095527 | 5/2001 |
| JP | 2008195253 | 8/2008 |
| JP | 2008303630 | 12/2008 |
| WO | 0125572 | 4/2001 |
| WO | 2009158469 | 12/2009 |
| WO | 2012015403 | 2/2013 |

OTHER PUBLICATIONS

SALES@usasupremetech.com, In the U.S. a Car is Stolen Every 26 Seconds, The Wave of the Future, Biometrics Authentication, An Introduction.

Kermit Whitfield, "A hitchhiker's guide to the telematics ecosystem," Automotive Design & Production, Oct. 2003, http://findarticles.com, pp. 103.

Ford Motor Company, "SYNC," Owner's Guide Supplement, SYNC System Version 3 (Aug. 2009).

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Driver Focus-Telematics Working Group, Statement of Principles, Criteria and Verification Procedures on Driver Interactions with Advanced In-Vehicle Information and Communications Systems, Including 2006 Updated Sections, Jun. 26, 2006.

* cited by examiner

METHOD AND APPARATUS FOR IN-VEHICLE ALARM ACTIVATION AND RESPONSE HANDLING

TECHNICAL FIELD

The illustrative embodiments generally relate to a method and apparatus for in-vehicle alarm activation and response handling.

BACKGROUND

Personal attacks in and around vehicles are becoming more and more commonplace in certain areas of the world. People are experiencing kidnappings, car-jackings, and other assaults while driving or otherwise using their vehicles. Victims experiencing these personal emergencies may wish to call someone for help. In some cases, they may have access to their phone and be able to use it and dial for help. In other cases, however, the phone may be unavailable, or the driver may be unable to use the phone for safety reasons.

Although alarm systems for vehicles exist, such as panic systems, it may be undesirable to alert an assailant that an alarm has been triggered. Whether a "panic" style alarm or one that notifies the police, alarm triggering may cause an assailant to escalate actions towards the victim.

U.S. Pat. No. 8,013,734 generally discusses a method of alarm notification. An alert mode of a mobile device is activated based on an emergency situation in an area. The mobile device transmits an indication of the emergency situation to a communication network control system. The communication network control system confirms the indication of the emergency situation to the mobile device and notifies emergency personnel of the indication of the emergency situation. The communication network control system transmits an indication of the emergency situation to one or more additional mobile devices in the area.

U.S. patent application Ser. No. 12/368,947 generally discusses methods and apparatus for providing useful data in association with a high-priority call such as an emergency call. In one embodiment, the data comprises a data (e.g., an MSD or FSD) embedded within one or more real-time protocol packets such as RTP Control Protocol (RTCP) packets, that are interspersed within the voice or user data stream (carried in e.g., RTP packets) of an emergency call. Apparatus and methods are described for transmitting the data portion reliably from the initiating terminal (e.g., an in-vehicle system) to a Public Safety Answering Point CPSAP), by using the same transport connection as the user data.

SUMMARY

In a first illustrative embodiment, a system includes one or more processors configured to detect activation of an alarm trigger in communication with the one or more processors. The processors are further configured to determine a type of trigger and provide a subtle feedback response, based on the type of trigger, designed to avoid detection by an assailant. The processors are additionally configured to wirelessly contact an emergency responder and provide data usable in determining a vehicle location and a vehicle identification.

In a second illustrative embodiment, a computer-implemented method includes detecting activation of an alarm trigger in communication with the one or more processors. The method further includes determining a type of trigger and provide a subtle feedback response, based on the type of trigger, designed to avoid detection by an assailant. The method also includes wirelessly contacting an emergency responder and providing data usable in determining a vehicle location and a vehicle identification.

In a third illustrative embodiment, a non-transitory computer readable storage medium, stores instructions that, when executed by a vehicle computing system processor, cause the processor to perform a method including detecting activation of an alarm trigger in communication with the one or more processors. The method performed by the processor also includes determining a type of trigger and provide a subtle feedback response, based on the type of trigger, designed to avoid detection by an assailant. The method further includes wirelessly contacting an emergency responder and providing data usable in determining a vehicle location and a vehicle identification.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
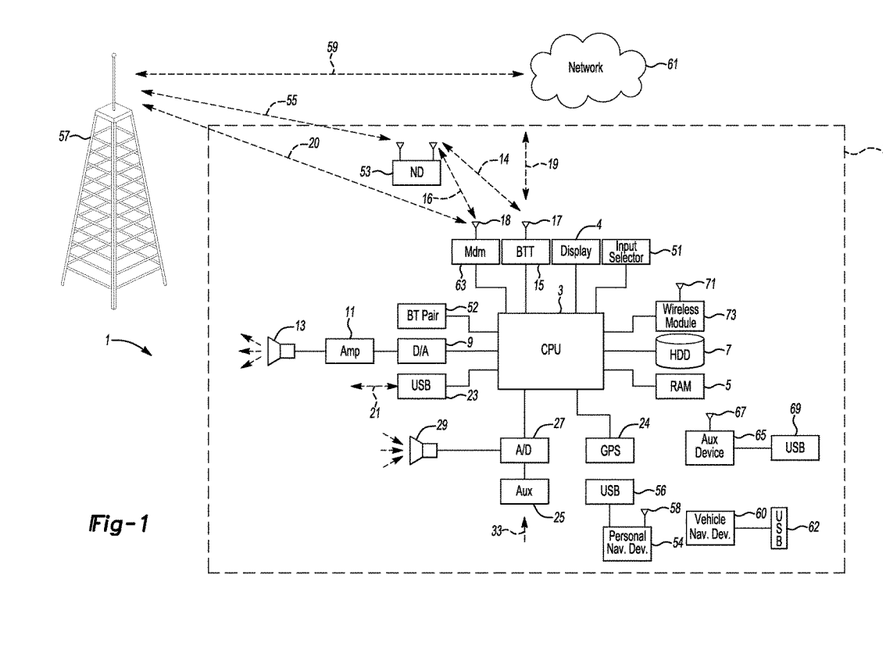
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

System outputs can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary devices 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In at least one illustrative embodiment, the silent alarm is realized through a triggering device. This device may be, for example, without limitation, carried by a person or attached by a customer to a surface in the vehicle. The device may have a triggering button that sends a message (such as in the non-limiting examples herein) when activated. Secondary triggering may also be enabled, for example, through steering wheel controls.

In at least some embodiments, feedback may be provided through devices such as, but not limited to, LED displays and/or a nav/radio head unit display. Triggered alarm signals may be sent to one or more off-board points of contact through various methods, and may include, for example, vehicle location information and other relevant information. The message may further be repeated at certain intervals or distance changes. In other embodiments, feedback may not be provided which can relate to "silent" alarms.

A variety of off-board actions can be implemented when an alarm message is triggered. For example, in a first process, various methods of actually sending the notification can be implemented. These include, but are not limited to, contacting an automated server, a live call center, 911/police directly, social media sites and/or a phone number. A variety of transport mechanisms may also be implemented, including, but not limited to, voice DTMF, voice DOV, a voice call, an SMS/text message, a mobile application and/or a data connection.

Further, one or more intermediary routing steps may occur. These steps can include, but are not limited to, routing through a server, a call center, a human operator or a social media server. Finally, in this generalization of an exemplary, illustrative process, one or more end-point contacts can receive the following forms of communication, including, but not limited to, a voice call, a mobile application notification, a social media update, an email and/or a SMS or text message.

In one illustrative example, a voice call can include data sent over voice, for example, if data transfer is desired. Or a dual-tone multi-frequency message can be provided, which can use tones to indicate certain variables or signals for an alarm (or respond to an automated system). An audio file could be sent, and in some examples the vehicle computing system can generate a voice message for transmission. In another example, if a data connection is established, emails, location sharing services and data packets can be utilized/sent for alarm notification purposes. A mobile application can be used, for example, to send a text or data packet, make a phone call, etc.

In addition, intermediary information may be added at any point along the line as the alarm is routed to a destination. For example, without limitation, at the vehicle, as the message is initiated/generated/sent, in case of emergency (ICE) information may be saved/pulled from a connected phone, for use in routing a primary or secondary message. Additionally, for example, reverse geo-coding may be done by a vehicle nav system, and/or directions may be added to a message by the nav system. Similarly, this information may be added by a user's phone at the origin point. Reverse geo-coding can include, but is not limited to, determining reference landmarks, distance and direction to those landmarks, cross-street locations/directions, current vehicle address/location and any other appropriate geographical data relating to a vehicle position.

Once the message passes to a server for routing, saved ICE information and/or routing information may be added at that point. Finally, at an ICE contact location, reverse geocoding and/or directions may be added to the message based on, for example, a transmitted GPS location of a vehicle.

Additionally, there may be a number of ways to activate an alarm system. Current systems include, but are not limited to, direct dial, wireless panic button devices, bandit lights, etc. Each of these systems, while useful, has some potential drawbacks. Accordingly, additional solutions can help provide a more comprehensive system.

The illustrative embodiments discussed herein relate to methods of safely and silently triggering an alarm (so as not to alert an attacker that an alarm has been triggered), and methods of subtly informing a user that an alarm has been activated. A discussion of possible data to include in an alarm notification is also included in the illustrative embodiments.

In many instances, it will be useful for the alarm activation to be an overt, obvious and even often loud and attention-grabbing event. These are cases where it is desirable to notify passers-by, or scare off an attacker. In other instances, it may be desirable not to notify an attacker of the alarm, due to, for example, usage in a remote location, where an attacker is more likely to become aggravated than scared at the onset of an alarm, and there are no passers-by to assist the person being assaulted.

Figure 2:
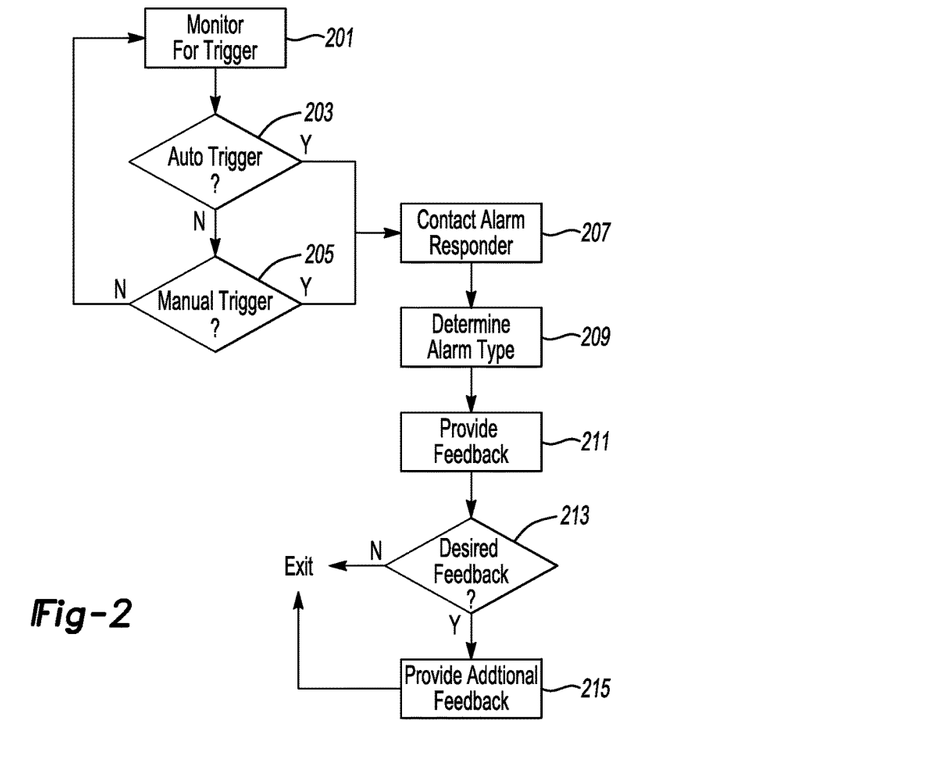
FIG. 2 shows an illustrative process for alarm activation handling.

FIG. 2 shows an illustrative process for alarm activation handling. In this general, exemplary solution, a process monitors both automated and manual triggers for a triggering event 201. Automated triggers are triggers that automatically occur based on an incident or state change, and can be useful if the owner is incapacitated or otherwise unable to manually trigger an alarm. Manual triggers represent a variety of triggers that a user can actively engage to activate an alarm state.

In this example, the process checks to see if an automated 203 or manual 205 trigger has been activated. In some cases, the activation of an automated trigger may require an additional automated or manual trigger before the alarm is engaged. If implemented, this can help avoid inadvertent activation of an alarm state. This is discussed in greater detail with respect to FIG. 3A. For the purposes of FIG. 2, the decision to proceed following activation with respect to elements 203 or 205 assumes that all required alarm activation conditions have been met.

Once the alarm has been triggered, an alarm responder is contacted 207. This can include a variety of responders, such as, but not limited to, police, 911, emergency contacts, an alarm monitoring company, etc. In some cases, a delay or cancellation period may be provided, so that an inadvertent triggering may be prevented. In other cases, triggering may result in direct and immediate contact of the emergency responder. Systems may include instances of both, and the response may vary based on differing triggers.

Once the responder has been contacted, and any necessary information has been relayed to provide assistance for the triggering party, the process may examine which type of alarm trigger was used to trigger the alarm. This is useful for determining any feedback to be provided.

Feedback, in this case, is provided based at least on the type of triggering mechanism used 211. Feedback can allow a triggering party to know that the alarm activation was successful (or alert the party of inadvertent triggering). This can set their mind at ease and prevent further attempts to trigger the system, any one of which may be noticed and put the party at risk. Since differing types of feedback (discussed in greater detail with respect to FIG. 4) are possible, it is reasonable to provide the feedback based at least in part on the triggering mechanism.

For example, if the feedback for in-vehicle automated triggering were to change a radio station, or, provide an instrument panel change (flash an engine check light, etc), it would be less useful to provide such feedback to a user who activated the alarm manually from outside the vehicle. Similarly, if the feedback were to vibrate a keyfob, it would be less useful if the user relied on an automated trigger, was held hostage in a rear seat, and didn't even have the fob in hand any longer. Accordingly, for the initial feedback, it may be useful to consider the mode of activation.

Once the initial feedback has been provided, the process may check to see if any secondary feedback is desired 213. For example, without limitation, a passenger may always desire the headlights to flash, or a keyfob to vibrate, if an alarm is active. If any predefined feedback outputs are set, the process will additionally provide those feedbacks 215 before exiting.

Figure 3A:
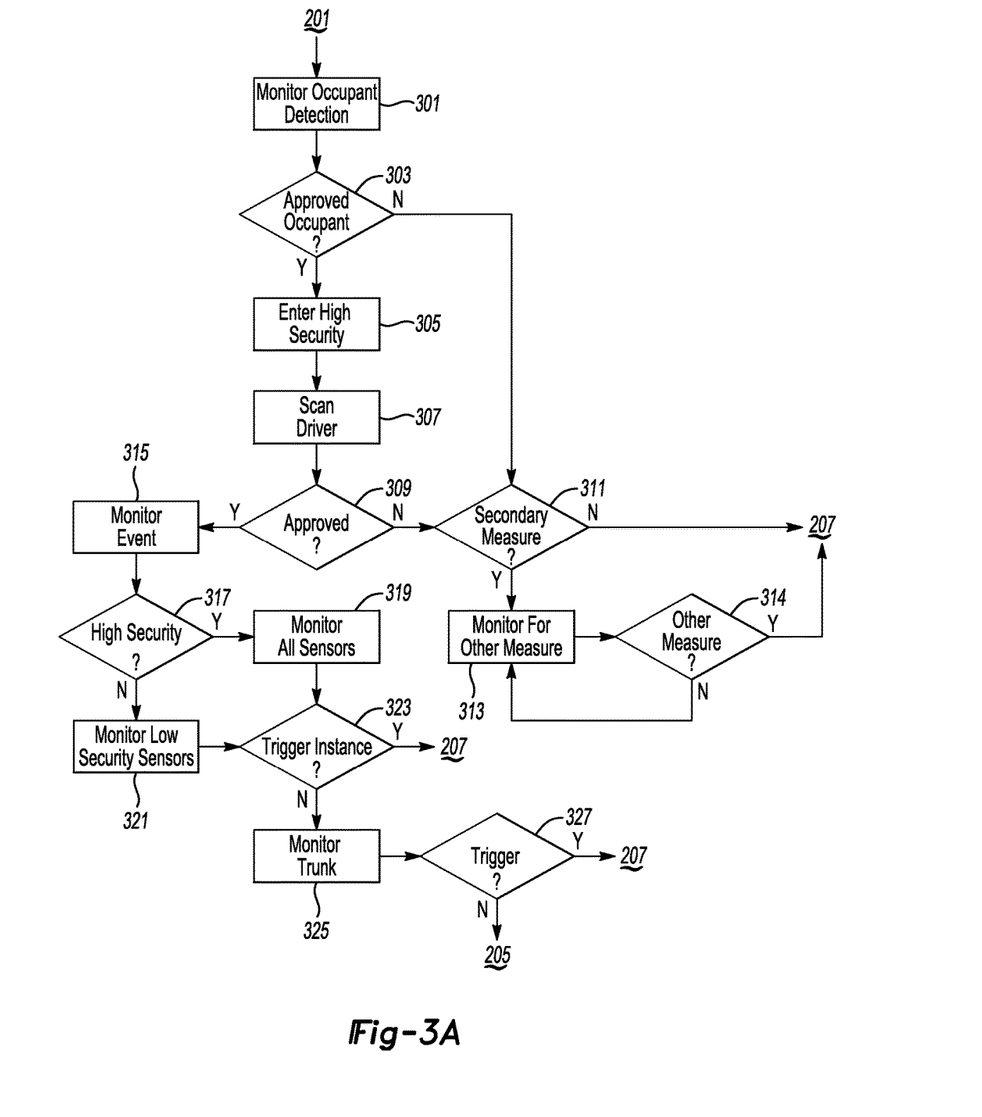
FIG. 3A shows an illustrative process for automated trigger processing.

FIG. 3A shows an illustrative process for automated trigger processing. In this illustrative example, a number of non-limiting instances of automated alarm activation are presented. These are aspects of the system that will activate based on a set of conditions having been met, and do not necessarily require any user interaction in order to notify a responder.

For example, without limitation, the process begins by monitoring an occupant detection system 301. This system can come in a number of forms, including, but not limited to, vehicle cameras, weight sensors, facial recognition, voice recognition, voice-pattern recognition, etc. Since this is one of the more subjective means of determining an unwelcome occupant, this can be paired with an additional trigger so as to avoid repeated inadvertent activation.

In this illustrative example, the process first determines if one or more approved occupants are in a vehicle 303. Approved occupants can include, but are not limited to, previously recognized occupants, registered occupants, etc. In this instance, if an approved occupant is present, the process may proceed to place the vehicle in a high-security state 305.

The high-security state places the vehicle "on alert" for one or more secondary triggers, since the approved occupant is present and their safety may be in jeopardy. Of course, these people are also present every time they drive or ride in the vehicle, so additional verification of a dangerous situation may be required prior to alarm activation.

One possible means of additional verification is to scan the driver 307. If the recognized occupant is present, and the driver is not approved 309, the system may move to another state of alert if desired 311. The tertiary state of alert avoids inadvertent activation of an alarm if, for example, an "unauthorized" friend drives a vehicle with the owner as a passenger. The friend is authorized for the purpose of the drive, but is not "authorized" within the meaning of "authorized driver" (i.e., recognized by the system).

In other cases, such as those where there is a relative degree of confidence that no "unauthorized" drivers will be operating the vehicle, the process may proceed directly to an alert state 207 when an unauthorized driver is present. In other instances, any "unapproved occupant" may serve in the place of "unapproved driver," but again, it may be desirable to take additional measures to avoid inadvertent alarm triggering. If additional measures are required, the process may monitor for secondary triggers 313 until another measure is present 314, which may activate some otherwise inactive detection modes. For example, without limitation, a "keyword" mode may become active, such that if a user speaks a keyword while the system is in a heightened alert state, the alarm may become active.

Also, in this example, the process may monitor for one or more violent or abnormal events 315. These include, but are not limited to, gunshot sounds, window shattering, heart rate change, visual weapon recognition, etc. These signals can be paired, for example, with a high alert state discussed above, again to avoid inadvertent triggering. For example, if a noise like a gunshot is heard, or an object believed to be a gun is visually detected, the process may also wait for a high-alert state (or already be in such a state) before triggering an alarm.

In this example, and possibly based on a specific event trigger, the process checks to see if there is a high alert state requirement associated with a given trigger or all triggers 317. For example, window shattering may always be a triggering event, whereas "gunshot noise" may only be triggering in the event of a high-alert, since the vehicle may be unable to distinguish between, for example, a back-fire or a gunshot.

If the system is currently in high-alert, all possible event sensors may be monitored 319, whereas if the vehicle is not in high-alert, only certain sensors (e.g., window shatter) 321 may be monitored. In other instances, all or none of the event sensing triggers may utilize a high-alert state requirement.

If there is sufficient data to result in a trigger 323, the process may proceed with the alarm 207. Otherwise, the process may proceed to monitor a trunk occupant detection system 325. The presence of any person in the trunk (detectable via heat, sound, etc.) 326, may automatically trigger an alarm.

Although some examples of automatic triggers have been presented, they are intended for example purposes only and are not intended to limit the scope of invention thereto. Any reasonable automatic trigger could be utilized in conjunction with the illustrative embodiments.

Figures 3B, 3C:
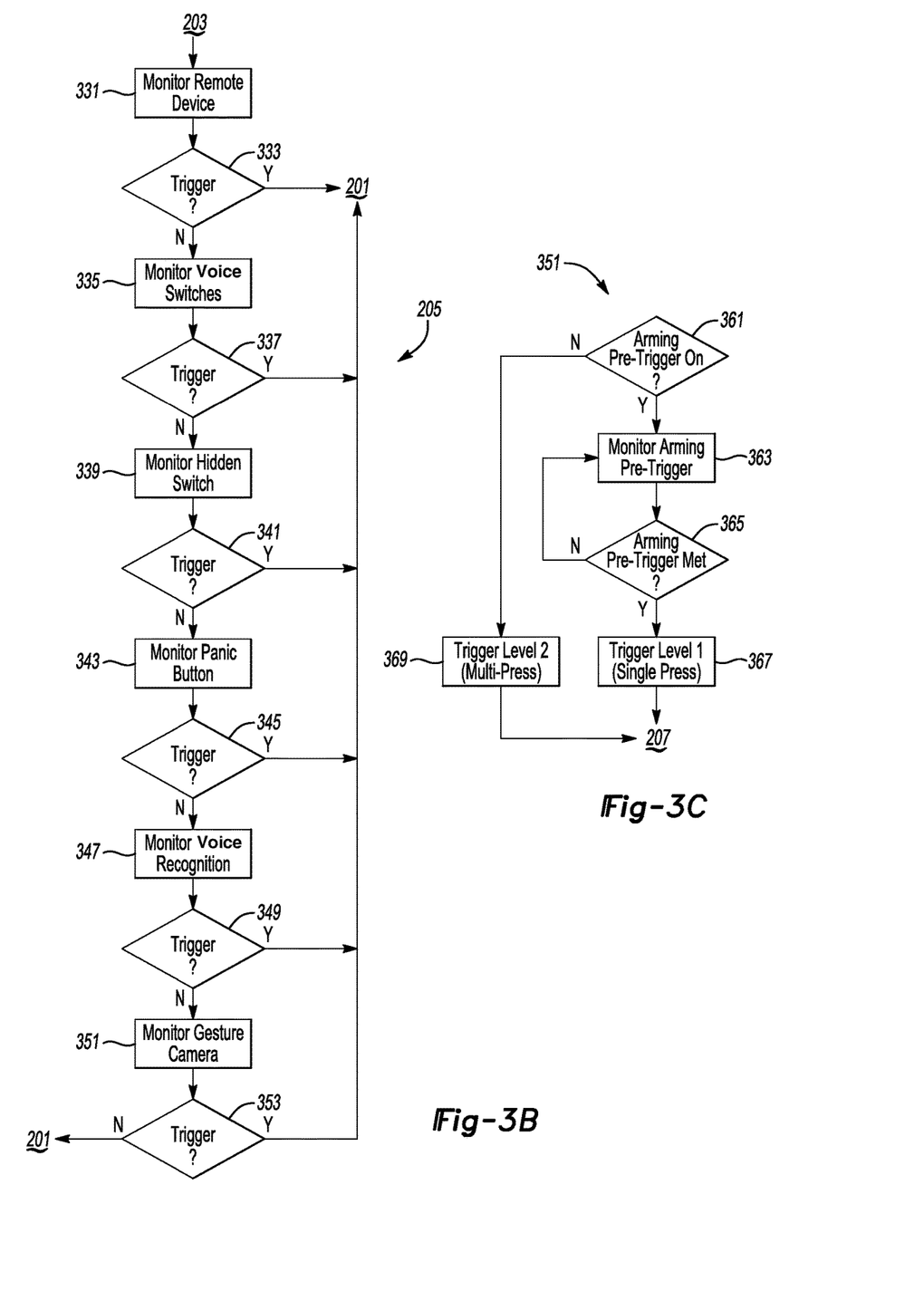
FIG. 3B shows an illustrative process for manual trigger processing.
FIG. 3C shows an illustrative process for gesture monitoring.

FIG. 3B shows an illustrative process for manual trigger processing. Unlike the automatic triggers, these are examples of triggers that require some form of user interaction to activate. These are essentially intentional triggers. The example shown shows a non-exhaustive list of these triggers, and is intended to provide some examples for the understanding of the embodiments, rather than to limit the invention thereto.

In this example, the process monitors a remote device 331, such as a wireless dedicated trigger device. This could be used in conjunction with a wireless, battery operated remote button (such as on a fob), which can be highly portable and accessible while outside a vehicle. Once triggered 333, the process will move to an alert state.

In another instance, the process may monitor one or more vehicle switches to determine if an alarm pattern has been input 335. For example, without limitation, inputs can include brake inputs, shifter inputs, seat controls, window switches, radio buttons, steering wheel switches, high beam switches, etc.

Since it is preferred to avoid inadvertent triggering, the switches may have to be activated in a given sequence in order to activate an alarm. For example, without limitation, two brake inputs followed by two window-up commands while in park may activate the alarm. In other instances, a switch held for a time-duration may be sufficient to activate the alarm. Any reasonable utilization of vehicle inputs is contemplated. If the vehicle switches indicate a triggering 337, the process may notify a responder. This sequence could be user-programmed or OEM programmed.

Also, the process may monitor a hidden switch 339. This is exactly what the name indicates, a switch hidden from common view, or hidden in plain sight in some manner. Activation of the hidden switch 341 results in triggering of the alarm.

The system could further monitor for activation of a panic button 341. This can be distinguished from the hidden switch in that it is a prominent button. The prominence can serve as a deterrent, and make the switch easy to find and activate. Triggering of this button 343 may result in an alarm state. A decoy button may also be presented, which distracts the attention of an assailant while a hidden switch is triggered.

In another instance, voice recognition can be used to monitor for an alert state 347. Speaking a key word or phrase, at any time or in conjunction with another trigger, can result in activation of the trigger 349. In other instances, if an alarm is active, a "safe word" can disable or cancel the alarm. Activation of the verbal trigger can result in a responder alert.

Finally, in this set of examples, gesture recognition can be monitored 351. Vehicle cameras can detect occupant gestures, and determine if those gestures correspond to an alert state. In some cases, one gesture can arm the system, another can send the alert. In other instances, a single gesture or gesture combination may result in an alert. Once triggered 353, the process can contact a responder. The user can develop his own gestures for this, the gestures can be OEM specified, etc.

These triggers can all also be linked to "high-security" states, so that, in a heightened state of "awareness," the vehicle may only need to monitor for a lesser input or gesture. I.e., in the high security state, some of the inadvertent triggering protections may be lowered.

FIG. 3C shows an illustrative example of a monitoring process. While shown with respect to element 351, it can relate to any monitoring process. In this example, the process checks to see if an arming pre-trigger is enabled 361 for that type of monitoring. In the absence of an arming pre-trigger, the process may require a low-security version of a trigger, such as a multi-button press 369. If there is an arming trigger associated with another trigger, the process may then monitor the arming pre-trigger 363 until the pre-trigger has been activated 365. Once activated, a lower threshold trigger (such as a single gesture or button press) may be enabled 367 for alarm activation. For example, if a panic button has been pressed, some of the "inadvertent trigger avoidance" may be ignored, to facilitate easier triggering in an emergency situation.

Also, in other situations, geographical and vehicle states may "pre-trigger" alarm states. That is, if a vehicle is suddenly in an extended stop at a light or when traveling outside of a "safe" zone, etc., a pre-trigger may be enabled, as the vehicle "guesses" that an emergency event may be occurring.

Figure 4:
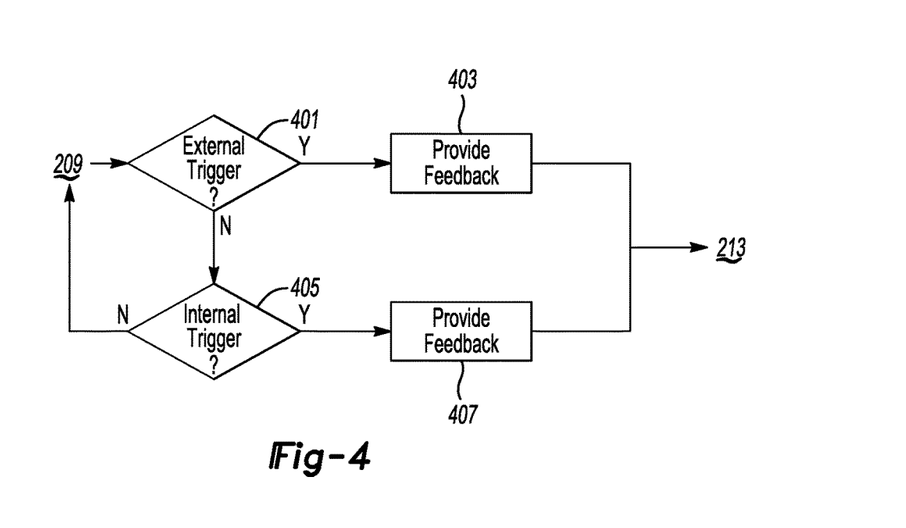
FIG. 4 shows an illustrative process for feedback handling.

FIG. 4 shows an illustrative process for feedback handling. Since the user may be unsure if an alarm has been triggered, especially in the case of subjective triggering, such as gesture based triggers or automatic triggers, it may be desirable to provide some feedback to the user. This could avoid the user's gesticulating wildly, attempting to activate an already active alarm, and possibly alarming the assailant.

In this illustrative example, the feedback process considers whether a trigger was external 401 or internal 403, and provides feedback accordingly 405. Typically, although not necessarily, the feedback will be some external form for an external trigger and some internal form for an internal trigger. Feedback states can also be set, and in some instances, additional feedback can be provided as desired.

In this example, the process can provide feedback in a number of forms. With respect to trigger devices, whether hand-held or in-vehicle, the physical device may contain one or more LEDs that light up in response to device activation. In another example, the device may contain a haptic motor that vibrates in response to activation, or provide an audible click or tactile feedback through the trigger.

In other in-vehicle examples, the feedback may take the form of messages displayed on an instrument cluster or on a trigger device display. In yet another example, radio stations could change to an uncommon setting (e.g., classical music, if that is not frequently enjoyed). Additionally or alternatively, radio volumes could change, or instrument panel lights could dim once or in a pattern.

In still further instances, a pedal could responsively move, a seat could move, a mirror could move, wipers could swipe, a steering wheel could nibble in a pattern or existing vehicle lights could activate/deactivate in a pattern.

Figure 5:
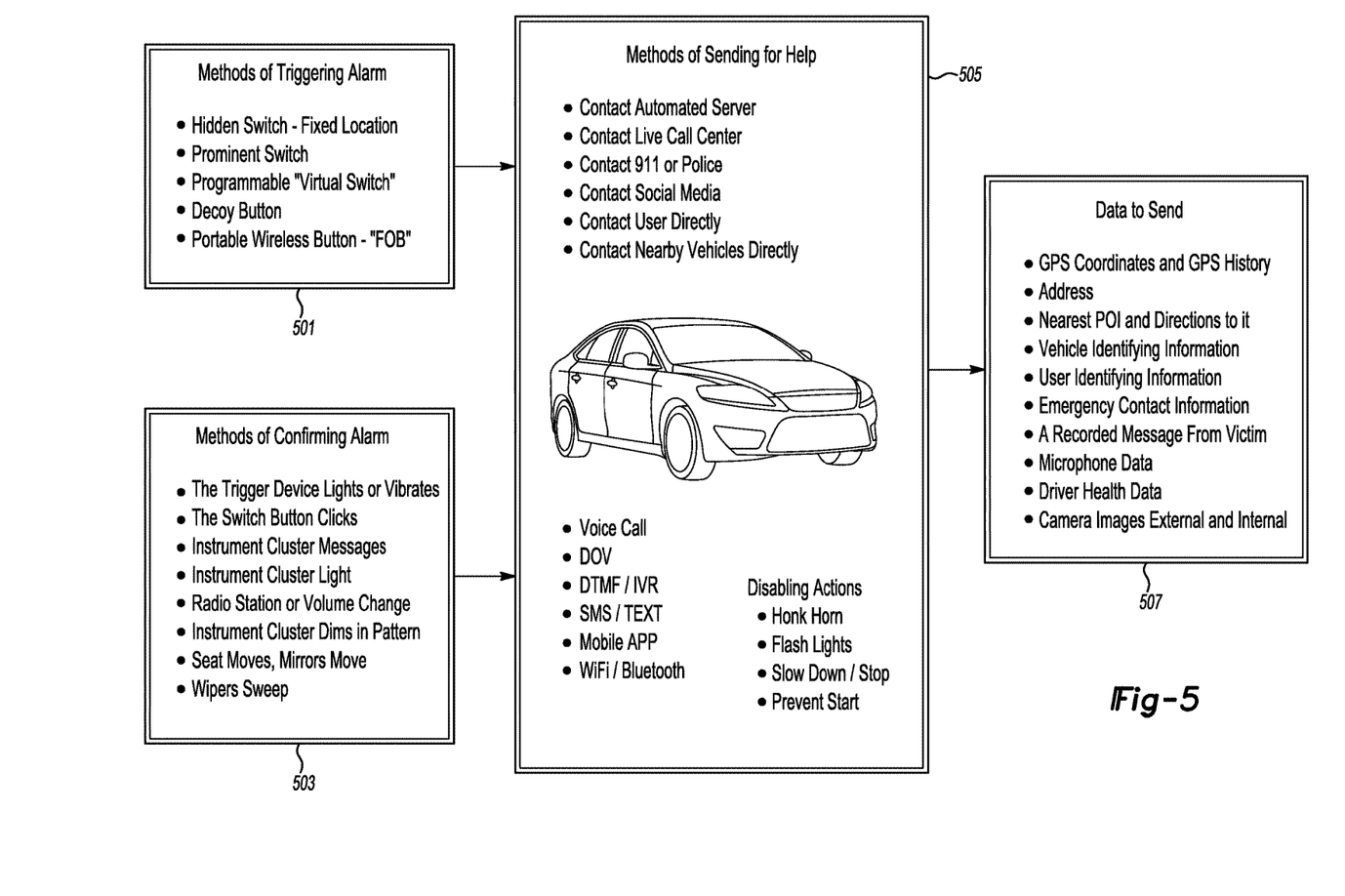
FIG. 5 shows an illustrative comprehensive alarm handling system.

FIG. 5 shows an illustrative comprehensive alarm handling system. This non-limiting example contains a number of the possible implementations discussed herein. Element 501 shows an example of methods of triggering an alarm, including, but not limited to, a hidden switch, a prominent switch, a virtual switch (e.g. pattern), a decoy button, a portable button, etc. Automated triggering is also possible.

Element 503 shows some illustrative examples of alarm confirmation, including, but not limited to, trigger device feedback (visual, audible or tactile), instrument panel message, instrument panel lights, radio station or volume changes, instrument panel dimming, vehicle component movement or response, etc.

Element 505 shows some various illustrative methods of sending for help from the vehicle. These include, but are not limited to, calling an automated server, calling a live call center, calling 911/police, posting to social media, contacting an emergency contact directly, contacting nearby vehicles. This communication can be done in a variety of forms, including, but not limited to, voice calls, data over voice (DOV), DTMF tones, text messaging, mobile application activation, WiFi/Bluetooth communication, etc.

In addition, one or more disabling/alert actions may be taken by the vehicle, including, but not limited to, horn honking, light flashing, vehicular slowing/halting, startup prevention, etc.

Once a connection has been established with a remote source for response to the emergency, data 507 can be sent, which includes, but is not limited to, GPS coordinates and history (for tracking), a nearby address, a nearby point of interest (POI), user/occupant identifying information, emergency contact information, phone identifying information, a recorded victim message, vehicle microphone/camera data (internal and/or external), driver medical/health data (current, if the driver is being monitored by the vehicle), etc.

Through utilization of the examples herein and similar implementations, a more robust and secure vehicular alarm system can be realized. It is possible to discretely operate an alarm and send a variety of important data to a remote system for response. Multiple activation trigger options, both active and automated, provide for added security and additional activation options to increase the success of alarm activation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
enable a secondary alarm trigger based on detection of both known and unknown vehicle occupants via a camera;
detect activation of the secondary alarm trigger;
determine an alarm trigger type and provide a subtle feedback response varying based on the trigger type, designed to avoid detection by an unauthorized vehicle occupant;
wirelessly contact an emergency responder; and
provide data usable in determining a vehicle location and a vehicle identification.

2. The system of claim 1, wherein the secondary alarm trigger includes a button.

3. The system of claim 1, wherein the secondary alarm trigger includes gesture recognition by the camera.

4. The system of claim 1, wherein the secondary alarm trigger includes a vehicle switch usage sequence comprising a plurality of activations of one or more vehicle switches whose primary purpose is to control a non-alarm vehicle function.

5. The system of claim 1, wherein the secondary alarm trigger includes a verbal component detectable by a vehicle microphone.

6. The system of claim 1, wherein the feedback response is a visual response.

7. The system of claim 1, wherein the feedback response is a tactile response.

8. The system of claim 1, wherein the feedback response is an audible response.

9. The system of claim 1, wherein the processor is further configured to provide data usable in determining a victim identification.

10. A computer-implemented method comprising:
detecting occupant-initiated activation of an alarm trigger, enabled in response to detection of both known and unknown vehicle occupants via a vehicle camera;
determining an alarm trigger type and providing a subtle feedback response varying based on the trigger type, designed to avoid detection by an unauthorized vehicle occupant;
wirelessly contacting an emergency responder; and
providing data usable in determining a vehicle location and a vehicle identification.

11. A non-transitory computer readable storage medium, storing instructions that, when executed by a vehicle computing system processor, cause the processor to perform a method comprising:
detecting occupant-initiated activation of an alarm trigger, enabled in response to detection of both known and unknown vehicle occupants via a vehicle camera;
determining an alarm trigger type and providing a subtle feedback response varying based on the trigger type, designed to avoid detection by an unauthorized vehicle occupant;
wirelessly contacting an emergency responder; and
providing data usable in determining a vehicle location and a vehicle identification.

* * * * *